May 30, 1933.  E. E. MURRAY ET AL  1,911,322
GEAR SHIFT LEVER
Filed Dec. 15, 1931
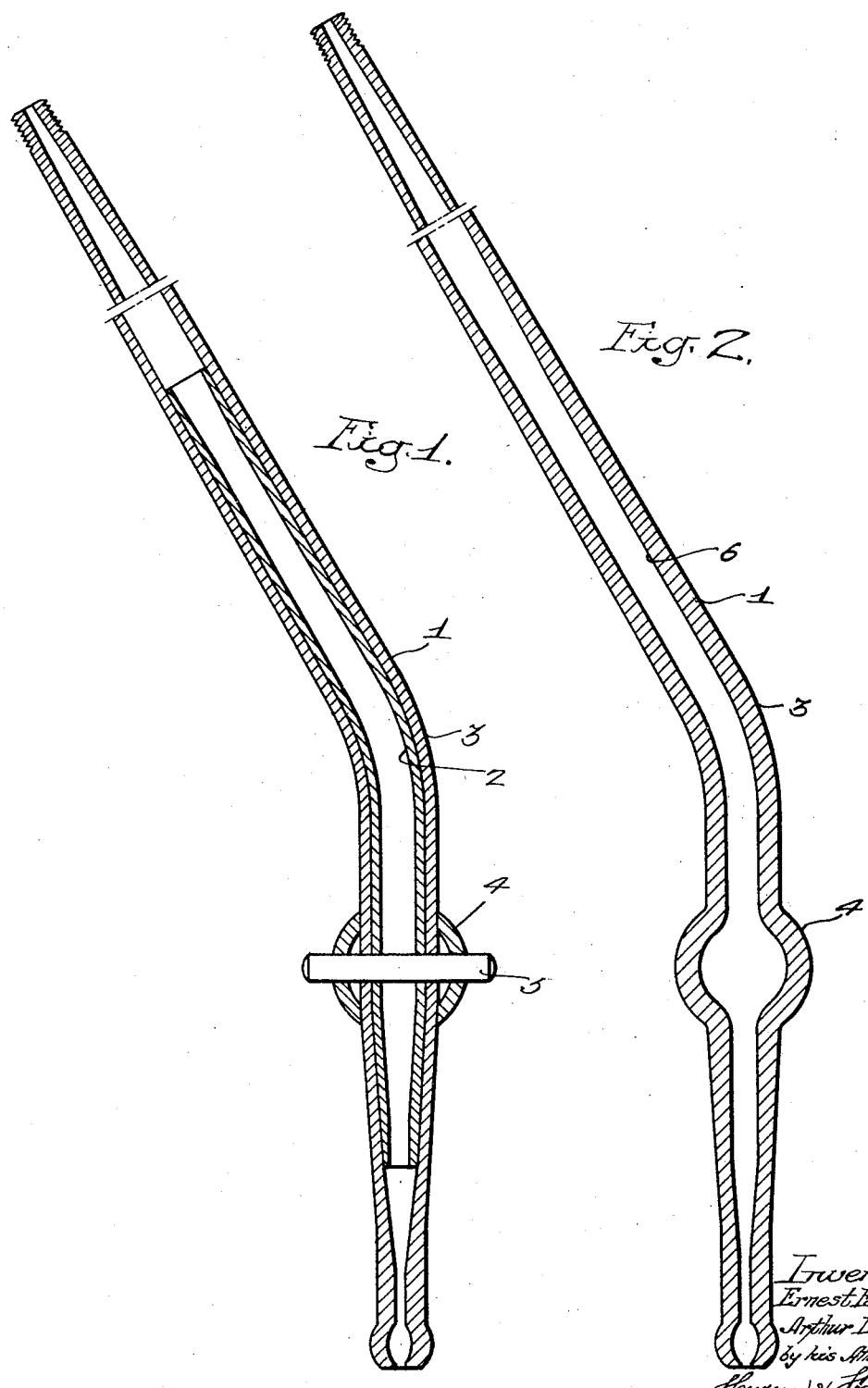

Patented May 30, 1933

1,911,322

UNITED STATES PATENT OFFICE

ERNEST E. MURRAY AND ARTHUR D. KNAPP, OF JACKSON, MICHIGAN

GEAR SHIFT LEVER

Application filed December 15, 1931. Serial No. 581,256.

This invention relates to levers, and particularly to gear shift levers for manually shifting the transmission gears of a motor vehicle. The present invention is in the nature of an improvement on that disclosed and claimed in our co-pending application, Serial No. 563,836, filed Sept. 19, 1931. This application is to be considered a continuation in part of said co-pending application as to all subject matter which is common to both applications.

The chief object of the invention is to provide an improved lever of this class which is simple in construction, economically manufacturable, and durable in use.

Heretofore it has been customary in the manufacture of gear shift levers to make such levers in the form of a unitary forging. In other words, the complete lever is formed from a single blank of metal and forged into its final shape. This method of making these levers has several disadvantages, the most important of which is that it involves considerable cost and makes the completed article a rather expensive item in the manufacture of motor vehicles. Another inherent characteristic of levers made in this fashion is that they are susceptible to excessive vibration because of their mass.

In order to provide an improved lever which eliminates the above-mentioned disadvantages, as well as others, we propose in our co-pending application above mentioned to form the lever in two or more parts or sections, at least one of the parts being hollow and formed from a tube by means of a swaging process on a swaging machine. In accordance with the present invention, we propose to form the lever from a unitary tube which is swaged to give it the desired shape. We also contemplate reinforcement of the lever at a desired portion thereof in the manners particularly set forth hereinafter. Levers made by means of the improved method disclosed herein may be manufactured at a cost which is considerably less than that of the forging process heretofore used. Our improved lever also has the advantage that it eliminates the above-mentioned tendency of prior art levers to vibrate because it has less mass and therefore less tendency to vibrate and sustain vibrations at critical frequencies.

Other features and advantages of our improved lever will be apparent from the description to follow. Reference may be had to the accompanying drawing for a clear illustration of our lever and the method of making the same.

In the drawing:

Fig. 1 is a sectional view showing one embodiment of our invention in which reinforcing is accomplished by means of an inner tube; and Fig. 2 is a similar view of an alternative embodiment of the invention in which a single tube having a thickened wall along a portion thereof is used, the desired reinforcing being had by virtue of the thickened wall portion.

Referring to the drawing, it will be noted that our improved lever takes the usual form and shape of levers in common use manufactured as previously set forth. As well known, such levers comprise an upper handle portion and a lower gear shifter actuating portion. The upper end of the lever is threaded to receive an operating knob or ball, while an integral ball portion is provided intermediate the handle and shifter actuating portions to constitute an element of a ball and socket pivotal mounting for the lever, as well known. As stated above, the lever of our invention is formed to have the same general shape as have prior art levers, as briefly described.

In accordance with the present invention, we propose to form the lever from a unitary tube having the desired diameter and we construct the lever by swaging such tube from a point intermediate its ends toward the ends thereof. Referring to Fig. 1, the tube in question is shown at 1. This tube, which originally has a certain desired diameter and length, is, in the embodiment of Fig. 1, provided with a suitable reinforcing tube 2. The reinforcing tube is of such diameter that it fits nicely within the main tube 1 and is of such length that it occupies a portion of the main tube which it is desired to reinforce. Due to the swaging of tube 1, as set forth hereinafter, the tapered ends thereof are given the desired strength and rigidity because the walls of the end portions are thickened by the swaging process. The intermediate wall portion of tube 1 remains substantially unchanged and is not as strong as are the end portions. The purpose of the reinforcing tube 2 is then to strengthen the intermediate portion of the main tube.

After the reinforcing tube has been inserted within the main tube, as described above, the composite structure is swaged on a swaging machine to impart to the lever the desired shape illustrated. The tubes are swaged from a desired point intermediate their ends, indicated at 3 in Fig. 1. As clearly illustrated, the wall thickness of the handle portion and also the wall thickness of the shifter actuating portion are caused by the swaging operation to increase toward the tapered ends of the lever. This is desirable since it imparts the desired degrees of rigidity to the upper and lower portions of the lever. As previously stated, the reinforcing tube strengthens the intermediate portion of the lever in which this action does not occur.

After the lever has been formed, as described, the usual ball portion 4 may be provided in any desired manner. In the embodiment of Fig. 1, this portion is provided by means of a separate element in the form of a ball having openings through the walls thereof for the lever and other openings to accommodate a pin 5. Pin 5 may serve the usual purpose of the pin ordinarily provided in such levers at the ball portion thereof and, in the present instance, it serves additionally as an attaching means for ball 4. If desired, the ball portion may be provided in any other suitable manner, such, for example, as by bulging the wall of the lever at the desired point to form the ball portion integrally with the lever. The ball portion of the lever illustrated in Fig. 2 is formed in this manner, as set forth hereinafter.

In the alternative embodiment of Fig. 2, the same general method of construction is followed. In this instance, however, a single tube is utilized, such tube having the intermediate portion reinforced by virtue of its wall being originally thickened at such portion. Originally the tube takes the same general form as that utilized in the embodiment of Fig. 1, but its wall is thickened, as at 6, over a desired intermediate portion of its length. This tube is swaged in the same manner as described above in connection with the lever of Fig. 1, the swaging taking place from an intermediate point 3 of the lever, as previously stated. The tapered ends of the lever have their walls thickened by the swaging process which is desirable and serves the same purpose as mentioned above. In this instance, however, the original thickness of the intermediate portion of the tube suffices to reinforce the same and the necessity for providing an additional tube as in Fig. 1 is eliminated. In the alternative embodiment, the ball portion 4 of the lever is formed by bulging the wall thereof at the desired point. This may be accomplished in any suitable manner, such, for example, as by placing the lever in a die and shaping it as illustrated. After the improved lever of our invention has been constructed in either of the above-described manners, it may be bent to give the handle portion the desired angle as is common in such levers. Because of the reduction in mass of the lever as formed by our proposed method, it has little tendency to vibrate. Obviously, the hollow construction which extends throughout the length of the lever lessens the mass thereof which in prior art levers tends to set them into vibration at critical speeds of the motor vehicle and to sustain such vibration at such speeds. Furthermore, the cost of making levers in accordance with the method disclosed herein is considerably less than that of prior art methods.

While we have disclosed herein several embodiments of our invention, it is to be understood that we do not limit ourselves to the specific forms illustrated, but contemplate such changes and modifications as would normally occur to persons skilled in the art, and such as are within the scope of the appended claims.

We claim:

1. A gear shift lever comprising a unitary tube having a tubular insert therein at a portion thereof which is subjected to strain.

2. A gear shift lever comprising a unitary tube having tapered ends and being reinforced intermediate its ends, the bore opening of the ends being tapered, the wall thicknesses of said ends increasing toward their diminished portions.

3. A gear shift lever comprising a tube having a tapered end and being reinforced remote from said end, the bore opening of said end being tapered, the wall thickness of said end increasing toward its diminished portion.

4. A gear shift lever comprising a tube having a tapered end and being reinforced by a tubular insert remote from said end the bore opening of said end being tapered, the wall thickness of said end increasing toward its diminished portion.

5. A gear shift lever comprising a tube having a tapered end and being reinforced by having its wall thickened remote from said end, the bore opening of said end being tapered, the wall thickness of said end increasing toward its diminished portion.

ERNEST E. MURRAY.
ARTHUR D. KNAPP.